(12) United States Patent
Jothimurugesan et al.

(10) Patent No.: US 11,787,701 B2
(45) Date of Patent: Oct. 17, 2023

(54) AMORPHOUS SILICA-ALUMINA COMPOSITION AND METHOD FOR MAKING THE SAME

(71) Applicant: CHEVRON U.S.A. INC., San Ramon, CA (US)

(72) Inventors: Kandaswamy Jothimurugesan, Hercules, CA (US); Hye-Kyung Timken, Albany, CA (US)

(73) Assignee: Chevron U.S.A. Inc., San Ramon, CA (US)

( * ) Notice: Subject to any disclaimer, the term of this patent is extended or adjusted under 35 U.S.C. 154(b) by 0 days.

(21) Appl. No.: 17/382,441

(22) Filed: Jul. 22, 2021

(65) Prior Publication Data

US 2022/0153603 A1 May 19, 2022

Related U.S. Application Data

(60) Provisional application No. 63/114,086, filed on Nov. 16, 2020.

(51) Int. Cl.
*C01F 7/34* (2006.01)
*B01J 21/12* (2006.01)
(Continued)

(52) U.S. Cl.
CPC .............. *C01F 7/34* (2013.01); *B01J 21/12* (2013.01); *B01J 35/1019* (2013.01);
(Continued)

(58) Field of Classification Search
CPC .................................... B01J 21/12; C01F 7/34
See application file for complete search history.

(56) References Cited

U.S. PATENT DOCUMENTS 3,664,972 A 5/1972 Jaffe
4,226,743 A 10/1980 Seese et al.
(Continued)

FOREIGN PATENT DOCUMENTS

CN 1787966 A * 6/2006 ............ B82Y 30/00
EP 2392548 A1 12/2011
(Continued)

OTHER PUBLICATIONS

Kiani et al., Influence of synthesis parameters on the properties of nanostructured γ-Alumina using Plackett-Burman experimental design. Int. J. Nano Dimens., 9 (4): 386-397, Autumn 2018.*
(Continued)

*Primary Examiner* — Jun Li
(74) *Attorney, Agent, or Firm* — E. Joseph Gess; Melissa M. Hayworth; Terrence M. Flaherty

(57) ABSTRACT

A process of making a silica-alumina composition having improved properties is provided. The process includes (a) mixing an aqueous solution of a silicon compound and an aqueous solution of an aluminum compound and an acid, while maintaining a pH of the mixed solution in a range of 1 to 3, and obtaining an acidified silica-alumina sol; (b) adding an aqueous solution of a base precipitating agent to the acidified silica-alumina sol to a final pH in a range of 5 to 8, and co-precipitating a silica-alumina slurry, wherein the base precipitating agent is selected from ammonium carbonate, ammonium bicarbonate, and any combination thereof; (c) optionally, hydrothermally aging the silica-alumina slurry to form a hydrothermally aged silica-alumina slurry; and (d) recovering a precipitate solid from the silica-alumina slurry or the hydrothermally aged silica-alumina slurry, wherein the precipitate solid comprises the silica-alumina composition.

12 Claims, 9 Drawing Sheets

(51) Int. Cl.
  *B01J 35/10* (2006.01)
  *B01J 37/03* (2006.01)
  *B01J 37/04* (2006.01)
(52) U.S. Cl.
  CPC ....... *B01J 35/1047* (2013.01); *B01J 35/1061* (2013.01); *B01J 37/031* (2013.01); *B01J 37/04* (2013.01); *C01P 2002/72* (2013.01); *C01P 2006/12* (2013.01); *C01P 2006/14* (2013.01); *C01P 2006/16* (2013.01)

(56) References Cited

U.S. PATENT DOCUMENTS

| | | |
|---|---|---|
| 4,239,651 A | 12/1980 | Alafandi et al. |
| 4,289,653 A | 9/1981 | Jaffe |
| 4,499,197 A | 2/1985 | Seese et al. |
| 4,711,868 A | 12/1987 | Shyr et al. |
| 4,721,696 A | 1/1988 | Kidd |
| 4,988,659 A | 1/1991 | Pecoraro |
| 5,079,208 A | 1/1992 | Lammers et al. |
| 6,723,297 B2 | 4/2004 | Chen et al. |
| 6,872,685 B2 | 3/2005 | Timken |
| 6,995,112 B2 | 2/2006 | Timken et al. |
| 7,700,515 B2 | 4/2010 | Ackrman et al. |
| 8,278,241 B2 | 10/2012 | Ackerman et al. |
| 8,772,196 B2 | 7/2014 | Ackerman et al. |
| 2004/0092383 A1* | 5/2004 | Timken .............. B01J 21/12 502/63 |
| 2009/0062115 A1* | 3/2009 | Ackerman .......... B01J 35/1061 502/263 |
| 2012/0122670 A1* | 5/2012 | Polli ................ B01J 37/04 502/263 |
| 2014/0187411 A1 | 7/2014 | Cooper et al. |

FOREIGN PATENT DOCUMENTS

| | | |
|---|---|---|
| EP | 2392548 B1 | 5/2020 |
| WO | 2020106836 A2 | 5/2020 |

OTHER PUBLICATIONS

PCT International Search Report, International Patent Appl. No. PCT/IB2021/056626, dated Nov. 2, 2021.

X.H. Li, Z. Tang, Y.M. Chai, R.Y Zhao and C. Liu "Hydrothermal Synthesis of Ammonium Aluminum Carbonate Hydroxide (AACH) Nanoplatelets and Nanofibers pH-Controlled Morphologies" Proc. 2012 Int. Conf. Mech. Eng. Mater. Sci. (MEMS 2012), 2013, 601-603.

* cited by examiner

AMORPHOUS SILICA-ALUMINA COMPOSITION AND METHOD FOR MAKING THE SAME

This application claims priority to and the benefit of U.S. Provisional Application Ser. No. 63/114,086, filed Nov. 16, 2020.

FIELD

The present disclosure relates to an amorphous silica-alumina composition with high pore volume and a method of making such composition.

BACKGROUND

Compounds such as silica, alumina and their amorphous mixtures (silica-alumina) are catalysts widely used in conversion reactions of hydrocarbons, such as oligomerization and hydrocracking reactions. Due to the porous structure and high surface area which characterizes them, these compounds (in particular amorphous silica-alumina) can be used as both catalysts and as carriers for metal catalysts. In the case of hydrocracking reactions, for example, one of the most widely used catalysts on an industrial scale is a bi-functional catalyst containing one or more metals uniformly distributed in a silica-alumina carrier. In this catalyst, the metal component catalyzes the hydrogenation reaction, whereas the silica-alumina, owing to its acidity characteristics, catalyzes the cracking reaction.

Amorphous silica-alumina compositions have surface acid sites which are generally weaker than the acid sites of zeolites. This moderate acidity allows silica-alumina-based catalysts to be used generally at high temperatures and at low space velocities. Moderate acidity is desirable to make a hydrorcracking catalyst selective for diesel production while minimizing overcracking toward to light naphtha formation.

Amorphous silica-alumina compositions also have a wide distribution of the pore dimensions. This allows to obtain a high diffusion rate of the reagent molecules (a particularly advantageous characteristic in the case of conversion processes of heavy hydrocarbon feedstocks) and to provide an ample surface area capable of receiving and effectively dispersing the possible metal component of the catalyst.

Numerous process for preparing a wide variety of forms of amorphous silica-alumina are known. It is also known that the specific operating conditions applied for the preparation significantly influence the catalytic and physicochemical properties of the silica-alumina obtained, such as for example the pore structure, overall volume, the surface area and the acidity characteristics.

It is desirable to have an amorphous silica-alumina composition that has certain physical and catalytic properties making it especially useful as a catalyst or a component of a catalyst for use in various catalytic applications.

It is also desirable to have a process for the preparation of amorphous silica-alumina having certain desired physical and catalytic properties.

SUMMARY

In one aspect, there is provided a process for preparing an amorphous silica-alumina composition, wherein the process comprises the steps of: (a) mixing an aqueous solution of a silicon compound and an aqueous solution of an aluminum compound and an acid, while maintaining a pH of the mixed solution in a range of 1 to 3, and obtaining an acidified silica-alumina sol; (b) adding an aqueous solution of a base precipitating agent to the acidified silica-alumina sol to a final pH in a range of 5 to 8, and co-precipitating a silica-alumina slurry, wherein the base precipitating agent is selected from ammonium carbonate, ammonium bicarbonate, and any combination thereof; (c) optionally, hydrothermally aging the silica-alumina slurry to form a hydrothermally aged silica-alumina slurry; and (d) recovering a precipitate solid from the silica-alumina slurry or the hydrothermally aged silica-alumina slurry, wherein the precipitate solid comprises the silica-alumina composition.

In a second aspect, there is provided a continuous process for preparing an amorphous silica-alumina composition, wherein the process comprises the steps of: (a) continuously contacting and mixing an aqueous solution of a silicon compound and an aqueous solution of an aluminum compound and an acid in a first mixing zone, while maintaining a pH of the mixed solution in a range of 1 to 3; (b) removing a first mixture from the first mixing zone continuously, wherein the first mixture comprises an acidified silica-alumina sol; (c) continuously contacting and mixing the first mixture and an aqueous solution of a base precipitating agent in a second mixing zone while maintaining a pH in a range of from 5 to 8 to produce a silica-alumina slurry, wherein the base precipitating agent is selected from ammonium carbonate, ammonium bicarbonate, and any combination thereof; (d) removing the silica-alumina slurry from the second mixing zone continuously; and (e) recovering a precipitate solid from the silica-alumina slurry, wherein the precipitate solid comprises the silica-alumina composition.

In a third aspect, there is provided a silica-alumina composition comprising amorphous silica-alumina having a total pore volume of at least 1.0 $cm^3/g$; wherein the silica-alumina composition, in its dried from, contains from 1 to 30 wt. % of ammonium aluminum carbonate hydroxide, based on a total weight of the silica-alumina composition, that is in a crystalline phase.

DETAILED DESCRIPTION

Definitions and Abbreviations

Figure 1:
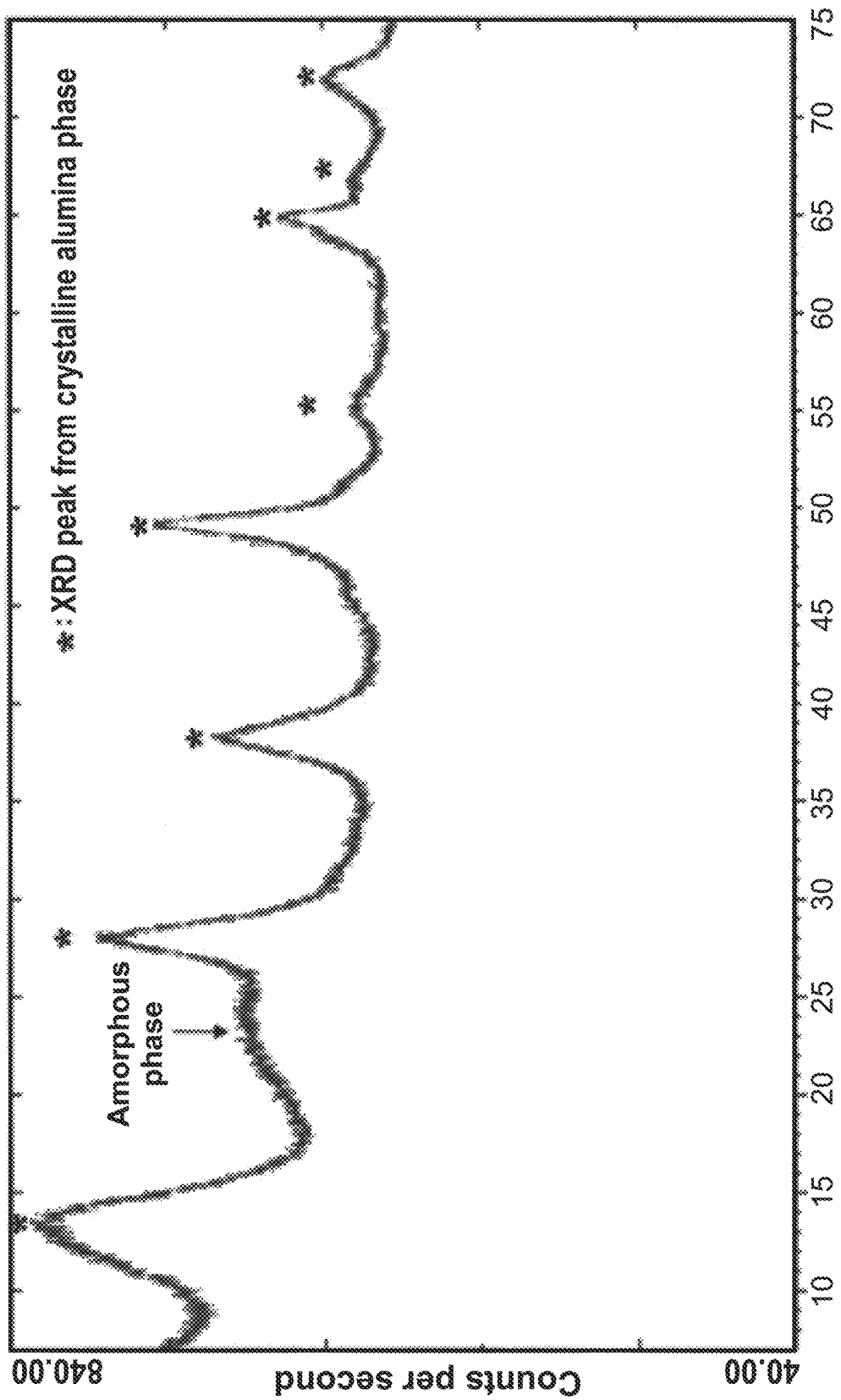
FIG. 1 shows a powder X-ray diffraction (XRD) pattern of SIRAL®-40 silica-alumina dried powder prior to calcination.

In this specification, the following words and expressions, if and when used, have the meanings given below.

The term "micropore" means solid materials having pores that have a diameter of less than 2 nanometers (<20 Å).

The term "mesopore" means solid materials having pores that have a diameter of from 2 to 50 nanometers (20-500 Å).

The term "macropore" means solid materials having pores that have a diameter of greater than 50 nanometers (>500 Å).

Each of the above definitions of micropore, mesopore and macropore are considered distinct such that there is no overlap and pores are not counted twice when summing up percentages or values in a distribution of pore sizes for any given sample.

The term "aqueous solution" herein refers to any solution in which the solvent is water. The aqueous solution may comprise water soluble substances that are dissolved in the solution and/or water insoluble compounds that are dispersed in the solution.

The term "continuous" means a system that operates without interruption or cessation. For example, a continuous sol process to produce a silica-alumina sol would be one where the reactants (acidified aluminum solution and aqueous solution of silicon compound) are continually introduced into one or more reactors and the aqueous product containing silica-alumina sol is continually withdrawn.

The term "co-gel" refers to the product resulting from the gelation of two or more components.

The term "dried silica-alumina" refers to a silica-alumina material from which the solvent, generally water, or mixture of water and one or more water-miscible solvents, has been substantially removed.

The term "calcined silica-alumina" refers a silica-alumina material heated in air, oxygen or an inert atmosphere to at least a temperature at which any remaining volatiles (including all organic materials and water) that were present in a dried substrate are removed. The temperatures used in calcination are generally between 400° C. and 900° C. for approximately 0.25 to 8 hours.

The term "ammonium aluminum carbonate hydroxide" may be abbreviated as "AACH".

Silica-Alumina Synthesis

The present process provides for the co-gel precipitation of a silica-alumina composition starting from a corresponding silica-alumina co-sol.

Silica-alumina according to the present disclosure may be prepared by a variety of methods employing batch and continuous processes in different combinations.

An acidified silica-alumina co-sol is obtained in process step (a) by mixing an aqueous solution of a silicon compound and an aqueous solution of an aluminum compound and an acid.

It is desirable to maintain the pH in a range of from 1 to 3 (e.g., 1 to 2.5), and to ensure vigorous and complete mixing of the aluminum and silicon solutions to minimize any unwanted gel or particle formation.

The aqueous solution of a silicon compound can comprise the silicon compound in an amount ranging from 2% to 15% (e.g., 5% to 10%) by weight of silicon expressed as $SiO_2$.

Suitable silicon compounds can be alkali metal silicates (e.g., sodium silicate), silicic acid, colloidal silica, precipitated silica, and fumed silica. In some aspects, the silicon compound is sodium silicate, in particular sodium silicate having a $SiO_2/Na_2O$ weight ratio in a range of from 2.5 to 3.5.

The aqueous solution of an aluminum compound can comprise the aluminum compound in an amount ranging from 2% to 25% (e.g., 5% to 10%) by weight of aluminum expressed as $Al_2O_3$.

Suitable aluminum compounds include aluminum salts (e.g., aluminum nitrate, aluminum sulfate), aluminum halides (e.g., aluminum chloride, aluminum bromide, aluminum iodide), and alkali metal aluminates (e.g., sodium aluminate).

Suitable acids contained in the aqueous solution of an aluminum compound are, for example, mineral acids and/or organic acids such as hydrochloric acid, nitric acid, sulfuric acid, formic acid, or acetic acid.

In step (b) of the process, an aqueous solution of a base precipitating agent is then added to the acidified silica-alumina sol. The addition of the base precipitating agent raises the pH of the sol, resulting in co-precipitation or co-gellation of the silica and alumina species. The base precipitating agent is selected from ammonium carbonate and/or ammonium bicarbonate.

Step (b) can be carried out via a batch process or a continuous process. In either case, the co-precipitation pH is to be uniformly maintained (i.e., held constant in a pH range of from 5 to 8, such as from 6 to 8 or from 6.5 to 7.5). It is desirable to have complete vigorous mixing of the silica-alumina sol solution with the basic precipitating agent and to maintain uniform pH throughout the mixture during step (b) in order to minimize formation of isolated silica domains and alumina domains.

The mixing or reaction vessel for process steps (a) and (b) can be any suitable vessel and associated equipment known in the art including a vessel that is equipped with means for stirring the contents of the vessel, such as a continuously stirred tank reactor or blender, to provide for blending and dispersing of the components therein and suspending and dispersing of precipitate solids. The vessel may also be equipped with means for exchanging heat with the contents of the vessel in order to provide for the control of the temperature of the vessel contents.

It is desirable to minimize the time required for mixing components in process steps (a) and (b) to only that which is required to provide a homogeneous mixture within the mixing zone. While the mixing time can vary depending on the type of equipment utilized, the equipment size, and other factors, the time required to combine, blend, and disperse components may be in a range of from 0.1 minute to 30 minutes per step.

Process steps (a) and (b) may be carried out at a temperature in a range of from 10° C. to 90° C. (e.g., 20° C. to 80° C.).

The hydrothermal aging in optional process step (c) can occur at a temperature of 20° C. to 200° C. (e.g., 20° C. to 120° C., or 120° C. to 180° C.) for a period of from 1 to 6 hours.

In process step (d), any suitable method known to those skilled in the art for separating the precipitate solid from the hydrothermally aged silica-alumina slurry may be used to recover the precipitate solid. Such methods include gravity separation, pressure separation, and vacuum separation and can include the use of equipment such as, for example, belt filters, plate-and-frame filters and rotary vacuum filters.

The recovered precipitate solid can be treated further by washing, ion exchange, drying, and/or calcination.

The recovered precipitate solid obtained in step (d) is typically washed with water to remove impurities, such as unreacted silicate and aluminum salts. The amount of water used to wash the precipitate solids may be any amount that suitably provides a washed powder having a pH that is with a range of from 2 to 8 (e.g., 2.5 to 7). The weight ratio of water to solids used in a single step may be in a range of from 01:1 to 100:1 (e.g., 0.5:1 to 50:1).

The washed precipitate solid is typically ammonium ion-exchanged to remove residual sodium. The weight ratio of water to solids used in a single step may be in a range of from 01:1 to 100:1 (e.g., 0.5:1 to 50:1). One or more ammonium exchange and washing steps may be used to purify the recovered precipitate solids. The washing and ammonium exchange step may be performed continuously on a belt conveyer.

The washed and ammonium exchanged precipitate solid may also be re-slurried and spray-dried using any of the suitable spray-drying methods known in the art to provide a spray-dried powder for convenience in handling and storage. Alternatively, the washed and ammonium exchanged precipitate solid may be flash dried or oven dried to provide a dried powder. The silica-alumina may be dried in air or any other suitable atmosphere under otherwise suitable drying conditions at a drying temperature of from 50° C. to 200° C. (e.g., 60° C. to 180° C.).

If desired, the dried silica-alumina material may be extruded, dried, and calcined to produce a silica-alumina catalyst or catalyst support. The extruded pellets may be dried in air or any other suitable atmosphere under otherwise suitable drying conditions at a drying temperature of from 50° C. to 200° C. (e.g., 60° C. to 180° C.). The extruded pellets, preferably after further being dried, may be calcined under suitable calcination conditions and, in particular, an oxygen-containing atmosphere (e.g., air) at a calcination temperature of from 400° C. to 900° C. (e.g., 450° C. to 650° C.) for 0.25 to 8 hours.

The silica-alumina compositions may be composited with other materials such as, for example, molecular sieves, clays, modifier clays, inorganic oxides, carbon, organic substances, etc. Catalysts derived from the present silica-alumina composition can have an active metal component. The active metal component may be selected from the group consisting of nickel, cobalt, molybdenum, tungsten, platinum, and palladium.

The silica-alumina composition can be used as a catalyst in industrial processes such as, for example, hydrocracking, hydrotreating (e.g., hydrodesulfurization, hydrodenitrogenation, hydrodemetallization), hydrofinishing, alkylation, oligomerization, alkylation, dechlorination, oxidation of hydrocarbons, and residue upgrading processes.

Silica-Alumina Composition

The silica-alumina composition prepared according to the present process is highly amorphous. In its dried form, the silica-alumina contains a minor amount of ammonium aluminum carbonate hydroxide hydrate that is crystalline. In some aspects, the crystalline ammonium aluminum carbonate hydroxide hydrate is of the formula $(NH_4)_2Al_6(CO_3)_3(OH)_{14} \cdot xH_2O$ and is structurally related to ammonium dawsonite. The amount of crystalline ammonium aluminum carbonate hydroxide is indicated by its characteristic powder X-ray diffraction (XRD) pattern. The present silica-alumina composition has a significant lack of XRD peaks which are representative of various other crystalline alumina phases such as pseudoboehmite. Generally, the amount of ammonium aluminum carbonate hydroxide that is in the crystalline phase is in a range of from 1 to 30 wt. % (e.g., 3 to 20 wt. %, or 5 to 15 wt. %), of the total weight of the silica alumina composition, in its dried form.

Upon calcination, the dried silica-alumina composition becomes completely amorphous and is free of crystalline material. By "free of crystalline material" is meant that crystalline phases are not present or, if any are present, their collective amount is not detectable by X-ray diffraction.

The amorphous silica-alumina composition can have a silica content in a range of from 20 wt. % to 80 wt. % (e.g., 30 wt. % to 70 wt. %). The alumina may be present in a range of from 20 wt. % to 80 wt. % (e.g., 30 wt. % to 70 wt. %). Chemical composition is determined by Inductively Coupled Plasma-Mass Spectrometry (ICP-MS).

A characteristic of amorphous silica-alumina composition obtained by the present process is that it has a significantly high total pore volume. The total pore volume of the amorphous silica-alumina composition is at least 1.0 cm$^3$/g (e.g., 1.0 cm$^3$/g to 2.0 cm$^3$/g, 1.2 cm$^3$/g to 1.9 cm$^3$/g, or 1.3 cm$^3$/g to 1.8 cm$^3$/g). The total pore volume can be determined by nitrogen physisorption in accordance with ASTM D6761.

Another characteristic of the amorphous silica-alumina composition obtained by the present process is that it has a significantly high surface area. The surface area can be in a range of from 200 m$^2$/g to 500 m$^2$/g (e.g., 300 m$^2$/g to 470 m$^2$/g). The surface area can be determined by nitrogen physisorption using the B.E.T. method in accordance with ASTM D3663.

Another characteristic of amorphous silica-alumina composition obtained by the present process is that it can have a high total pore volume in the mesopore region (i.e., 20 Å to 500 Å) and especially in the 200 Å to 500 Å mesopore region. The total mesopore volume of the amorphous silica-alumina composition can be at least 0.7 cm$^3$/g (e.g., 0.7 cm$^3$/g to 1.8 cm$^3$/g) and the pore volume in the 200 Å to 500 Å mesopore range can be at least 0.3 cm$^3$/g (e.g., 0.3 cm$^3$/g to 1.0 cm$^3$/g).

In some aspects, the amorphous silica-alumina composition has a porosity such that a volume of mesopores with a diameter in a range of 200 Å to 500 Å represents 30% to 80% of the total pore volume measured by nitrogen physisorption.

EXAMPLES

The following illustrative examples are intended to be non-limiting.

Example 1 (Comparative)

SIRAL®-40 silica-alumina (obtained from Sasol) was used as a comparative example. The physical properties of this material are summarized in Table 1.

The powder XRD pattern of SIRAL-40 silica-alumina (as-received dried powders) is shown in FIG. 1 and indicates that this material has a significant amount of crystalline pseudoboehmite. Quantification indicated that SIRAL-40 silica-alumina contains about 48% of a crystalline alumina phase relative to a crystalline standard. The quantitation of the crystalline phase was done using a pure CATAPAL® B alumina as the reference.

This silica-alumina was used to prepare the hydrocracking catalyst described in Example 11.

Example 2 (Comparative)

SIRAL®-40 HPV silica-alumina (obtained from Sasol) was used as another comparative example. The physical properties of this material are summarized in Table 1.

Figure 2:
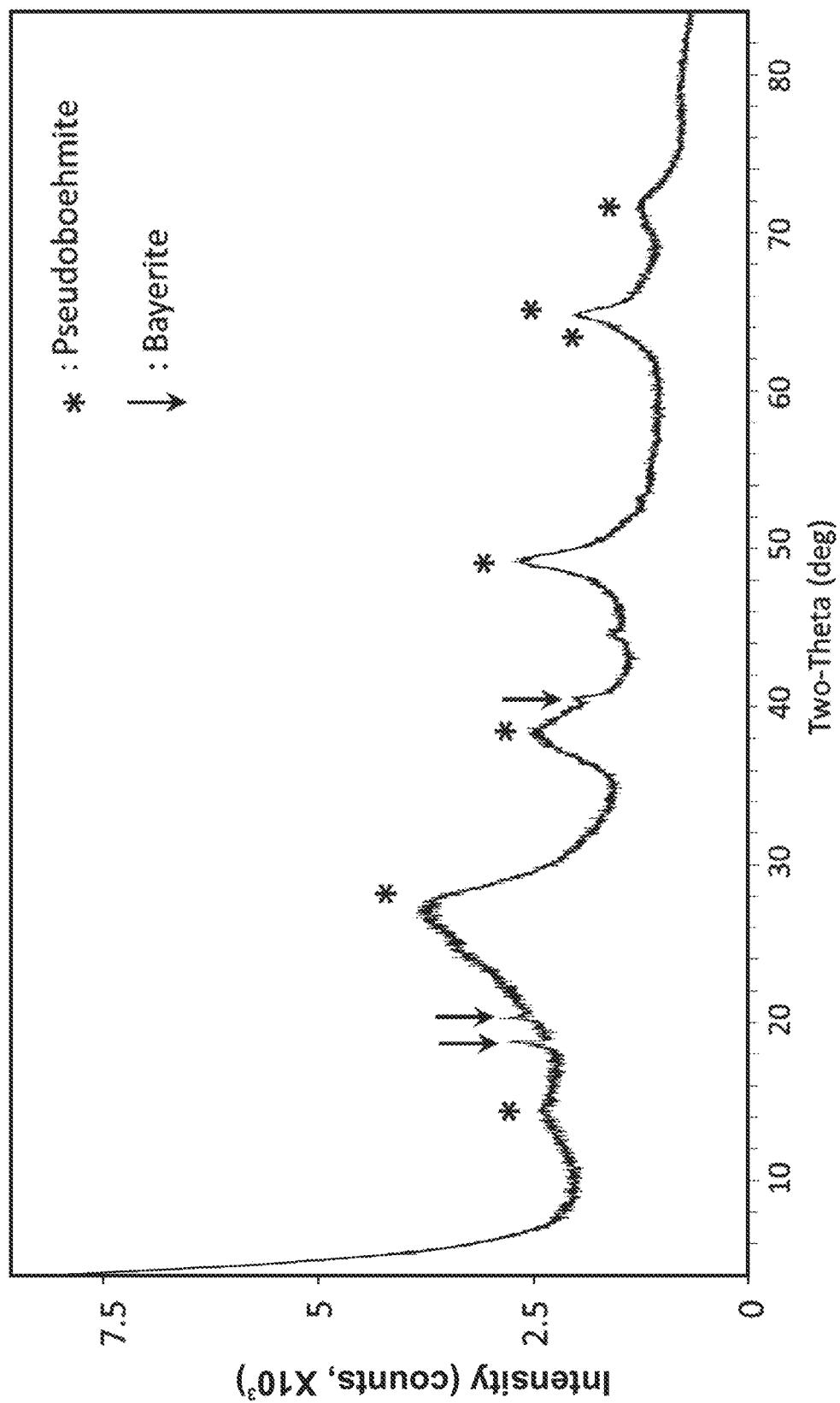
FIG. 2 shows a powder XRD pattern of SIRAL®-40 HPV silica-alumina dried powder sample prior to calcination.

The powder XRD pattern of SIRAL-40 HPV silica-alumina (as-received dried powders) is shown in FIG. 2 and indicates that the material has a significant amount of crystalline pseudoboehmite and a trace amount of bayerite. Quantification indicated that the material contained about 29% of a crystalline alumina phase relative to a crystalline alumina standard.

This silica-alumina was used to prepare a hydrocracking catalyst described in Example 12.

Example 3 (Comparative)

Synthesis of Silica-Alumina by Continuous Sol Preparation and Gellation

An acidic aluminum solution (Solution I, containing 5.2 wt. % $Al_2O_3$) was prepared by dissolving 2396 g of aluminum chloride and 711 g of hydrochloric acid (37%) in 6623 g of deionized water.

A dilute solution of sodium silicate (Solution II, containing 6 wt. % $SiO_2$) was prepared by diluting 2070 g of concentrated sodium silicate solution (containing 29 wt. % $SiO_2$ and 9 wt. % $Na_2O$) with deionized water.

The silicate solution (Solution II) and the aluminum solution (Solution I) were pumped separately and simultaneously into an in-line blender with about 100 cm$^3$ of mixing chamber volume while vigorously mixing with 1000 rpm blender-blade rotation to prepare Solution III. The residence time of the solution in the mixing chamber was approximately 0.53 minutes. The final pH of the Solution III was 2.1, and the mixing produced a clear silica-alumina sol in the aqueous solution. The final Solution III had a $SiO_2/Al_2O_3$ molar ratio of 2.0 and a $H^+/Na^+$ molar ratio of 1.2.

A dilute ammonia solution (containing 8 wt. % $NH_3$) was prepared for gellation. The dilute ammonia solution and Solution III containing the silica-alumina sol were pumped separately and simultaneously into the mixing chamber of an in-line blender. Mixing in the in-line blender was vigorous with 1600 rpm blender-blade rotation. The volume of the mixing chamber is smaller than the total volume of solutions pumped in 1 minute (i.e., less than 1-minute residence time per volume). The addition rate of the ammonia solution was adjusted to maintain the pH of the gel product at 7.0±0.5. The gel slurry was collected and then aged at room temperature for 2 hours while stirring. This cogelled silica-alumina was filtered to produce a filter cake. The filter cake was washed with a hot solution of ammonium nitrate (200 g of ammonium nitrate in 10 L of deionized water at 150° F.) and then rinsed with 20 L of deionized water. The washing step was repeated four more times. Finally, the slurry was spray-dried using a MOBILE MINOR® spray-dryer (type H, Model 2000, Niro Inc.) having an inlet temperature of about 550° F. and an outlet temperature of about 212° F. A small amount of the spray dried silica-alumina was calcined under excess dry air at 1000° F. for 1 hour for activation.

Figure 3:
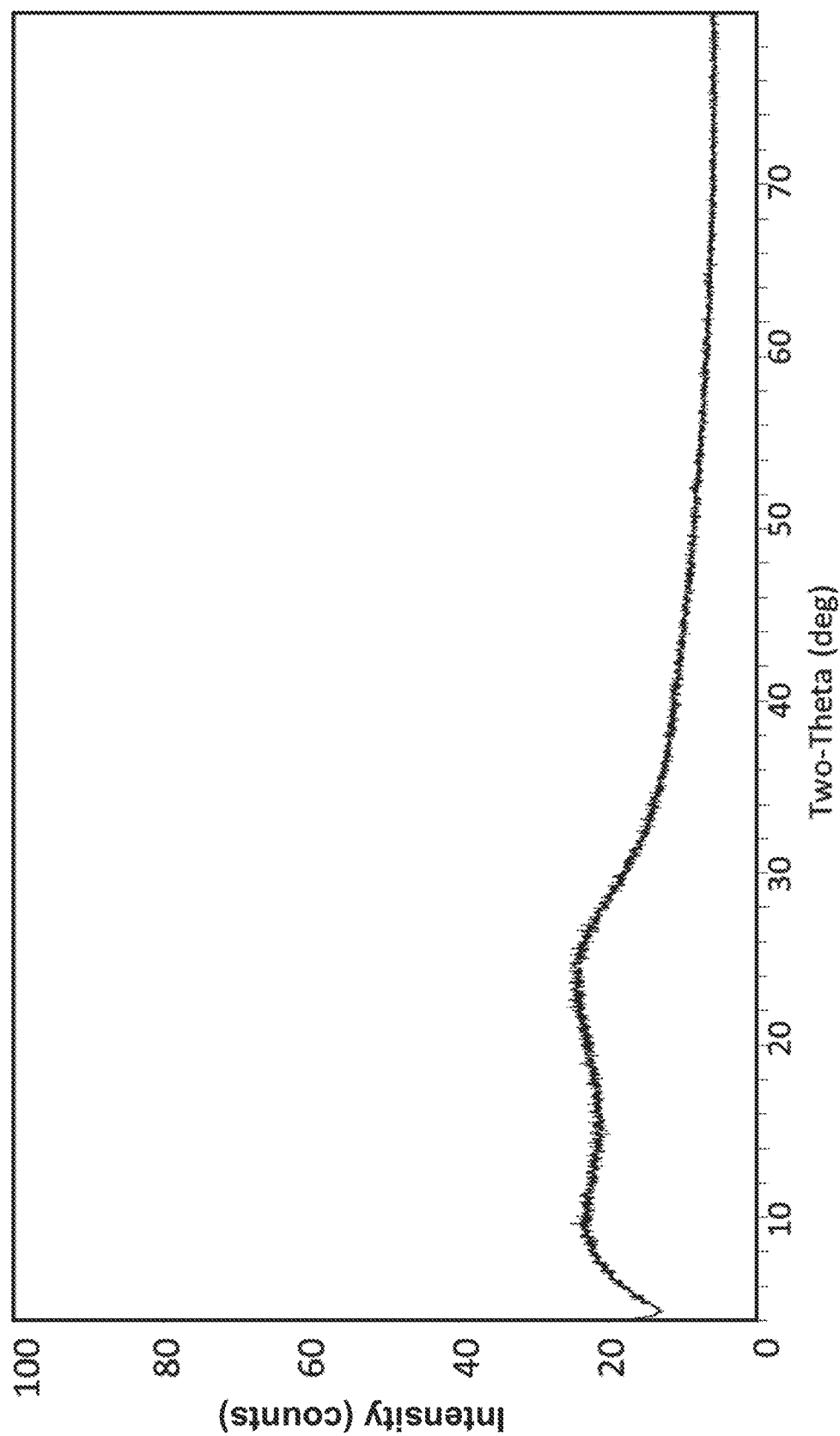
FIG. 3 shows a powder XRD pattern of the silica-alumina dried powder sample prepared in Example 3 prior to calcination.

The physical properties of the final silica-alumina are summarized in Table 1 and Table 2. The powder XRD of the dried product is shown in FIG. 3 and indicates that the silica-alumina is homogeneous throughout the particles and is completely amorphous.

This support was used to prepare the hydrocracking catalyst described in Example 13.

Example 4 (Comparative)

Synthesis of Silica-Alumina in an Open Beaker at Atmospheric Pressure

To understand how vigorous mixing in an enclosed in-line blender affects the formation of the high pore volume silica-alumina, a silica-alumina synthesis was carried out in an open beaker where no backpressure is applied and where carbonate may freely leave the container via $CO_2$ evolution during the gellation.

An acidic aluminum solution (Solution I, containing 5.0 wt. % $Al_2O_3$) was prepared by dissolving 207 g of $AlCl_3.6H_2O$ and 59.3 g of hydrochloric acid (37%) in 648 g of deionized water.

A dilute solution of sodium silicate (Solution II, containing 5 wt. % $SiO_2$) was prepared by diluting 188 g of concentrated sodium silicate solution (containing 29 wt. % $SiO_2$ and 9 wt. % $Na_2O$) with deionized water.

The silicate solution (Solution II) and aluminum solution (Solution I) were pumped separately and simultaneously to a beaker while an overhead mixer in the beaker was mixing the two incoming solutions vigorously to prepare Solution III. Solution III was withdrawn from the beaker using a peristaltic pump to maintain the residence time of the mixing solution in the beaker of less than 1 minute. The final pH of Solution III was 2.2, and the mixing produced a clear silica and alumina solution. The final Solution III had a $SiO_2/Al_2O_3$ molar ratio of 2.0 and a $H^+/Na^+$ molar ratio of 1.1.

A 2.0 M ammonium carbonate solution was prepared for gellation. The dilute ammonia carbonate solution and the Solution III containing the silica and alumina sol were pumped separately and simultaneously into the mixing vessel at atmospheric pressure in a beaker. The addition rate of the ammonia carbonate solution was adjusted to maintain the pH of the gel product at 7.0±0.1 and the gel slurry level was maintained by continuously withdrawing the gel slurry. The gel slurry was collected and then aged at 160° F. for 2 hours while stirring. This cogelled silica-alumina was filtered to produce a filter cake. The filter cake was washed with a hot solution of ammonium nitrate and then rinsed with deionized water. The washing step was repeated four more times. Finally, the slurry was filtered to produce a filtered cake, and dried in the oven at 120° C. for 12 hours. A small amount of the dried silica-alumina was calcined under excess dry air at 1000° F. for 1 hour for activation.

Figure 4:
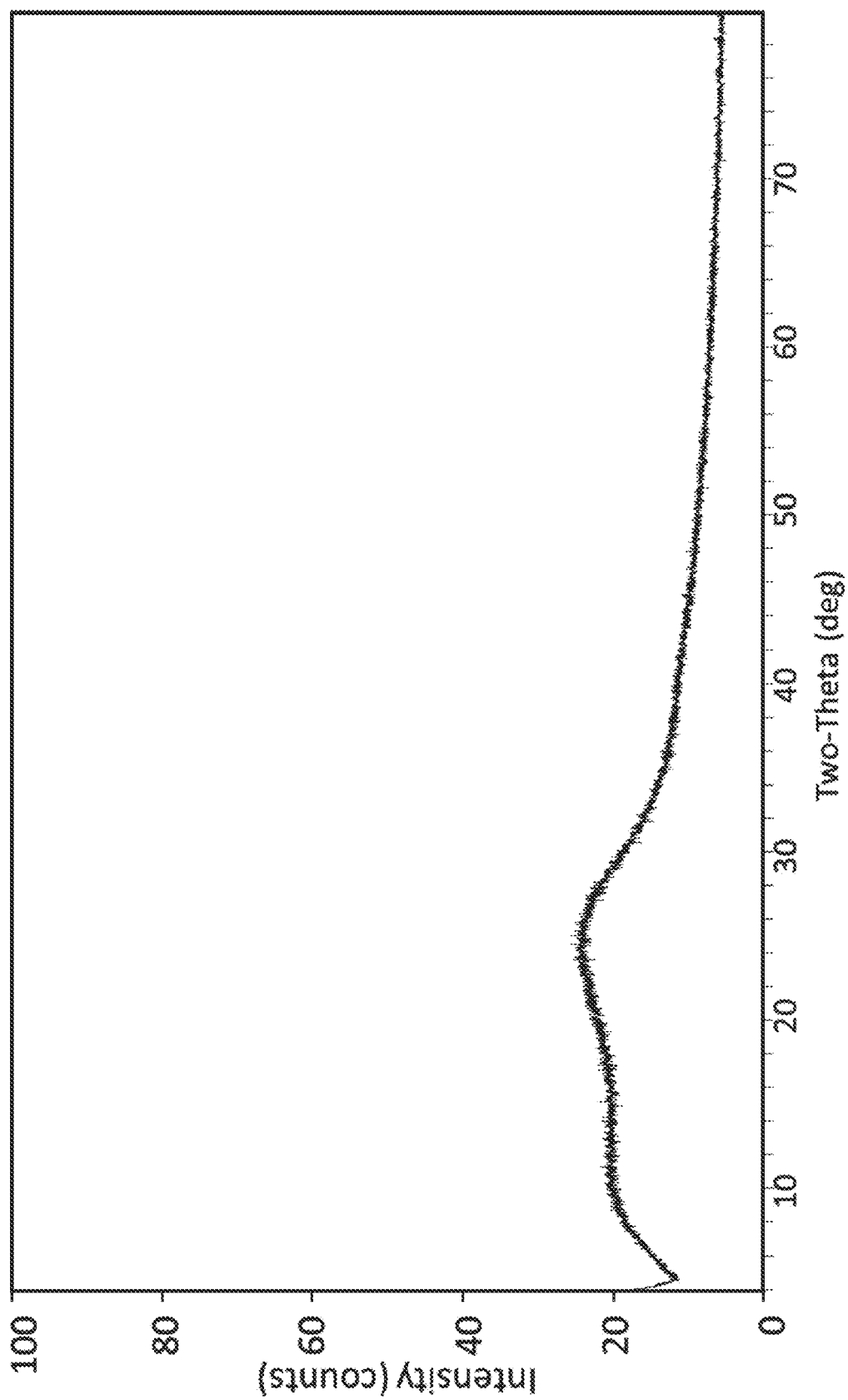
FIG. 4 shows a powder XRD pattern of the silica-alumina dried powder sample prepared in Example 4 prior to calcination.

The physical properties of the final silica-alumina are summarized in Table 1 and Table 2. The power XRD of the product is shown in FIG. 4 and indicates that the silica-alumina is homogeneous throughout the particles and amorphous. The total pore volume of this silica-alumina was only 0.49 cm$^3$/g.

Example 5

Synthesis of High Pore Volume Silica-Alumina by Continuous Gellation

An acidic aluminum solution (Solution I, containing 6 wt. % $Al_2O_3$) was prepared by dissolving 2105 g of $Al_2(SO_4)_3.xH_2O$ and 239 g of sulfuric acid (98%) in 3023 g of deionized water.

A dilute solution of sodium silicate (Solution II, containing 6.6 wt. % $SiO_2$) was prepared by diluting 1317 g of concentrated sodium silicate solution (containing 29 wt. % $SiO_2$ and 9 wt. % $Na_2O$) with 4071 g of deionized water.

The alumina/sulfuric acid solution (Solution I) and the silicate solution (Solution II) were pumped separately and simultaneously into the mixing chamber of an in-line blender while vigorously mixing. Mixing in the in-line blender was vigorous with 1000 rpm blender-blade rotation to prepare Solution III. The final pH of the Solution III was 2.1, and the mixing produced a clear silica and alumina solution. The final Solution III had a $SiO_2/Al_2O_3$ molar ratio of 2.0 and a $H^+/Na^+$ molar ratio of 1.2

A 2.0 M ammonium carbonate solution was prepared for gellation. The dilute ammonia carbonate solution and the Solution III containing the silica and alumina sol were pumped separately and simultaneously into the mixing chamber of an in-line blender. Mixing in the in-line blender was vigorous with 1000 rpm blender-blade rotation. The volume of the mixing chamber was smaller than the total volume of solutions pumped in 1 minute (i.e., less than 1-minute residence time per volume). The addition rate of the ammonia carbonate solution was adjusted to maintain the pH of the gel product at 7.0±0.1. The gel slurry was collected and then aged at 160° F. for 2 hours while stirring. This co-gelled silica-alumina was filtered to produce a filter cake. The filter cake was washed with a hot solution of ammonium nitrate (200 g of ammonium nitrate in 10 L of deionized water at 150° F.) and then rinsed with 20 L of deionized water. The washing step was repeated four more times. Finally, the slurry was spray-dried using a MOBILE MINOR spray-dryer having an inlet temperature of about 550° F. and an outlet temperature of about 212° F. A small amount of the spray dried silica-alumina was calcined under excess dry air at 1000° F. for 1 hour for activation.

Figure 5:
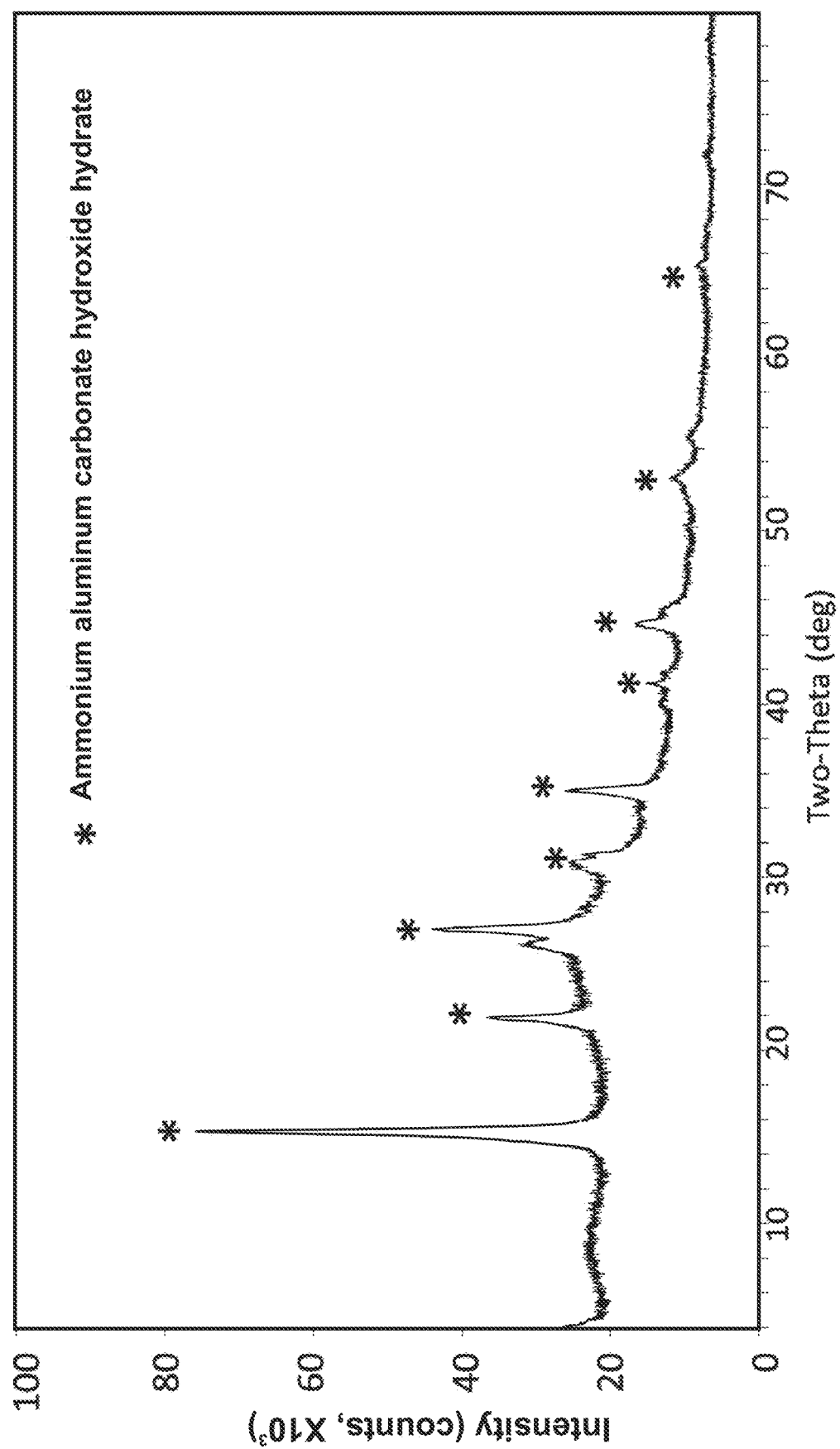
FIG. 5 shows a powder XRD pattern of the silica-alumina dried powder sample prepared in Example 5 prior to calcination.

The physical properties of the final silica-alumina are summarized in Table 1 and Table 2. The powder XRD pattern of the dry cake is shown in FIG. 5 and indicates that the silica-alumina product prepared using ammonium carbonate as the precipitating agent produced a homogenous gel containing a crystalline phase as well as amorphous silica-alumina. XRD characterization identified the crystalline phase as ammonium aluminum carbonate hydroxide hydrate [$(NH_4)_2Al_6(CO_3)_3(OH)_{14} \cdot xH_2O$], a material structurally related to ammonium dawsonite. Quantitation of the XRD intensity indicates about 10% crystalline phase of ammonium aluminum carbonate hydroxide hydrate is present in the silica-alumina gel. The quantitation of the crystalline phase was done using a pure ammonium aluminum carbonate hydroxide, $NH_4Al(OH)_2CO_3$, synthesized according to the procedure of X. H. Li et al. (Proc. 2012 *Int. Conf. Mech. Eng. Mater. Sci.* (MEMS 2012) 2013, 601-603). This silica-alumina material does not contain any of the typical alumina phases such as pseudoboehmite, boehmite or gibbsite.

Figure 6:
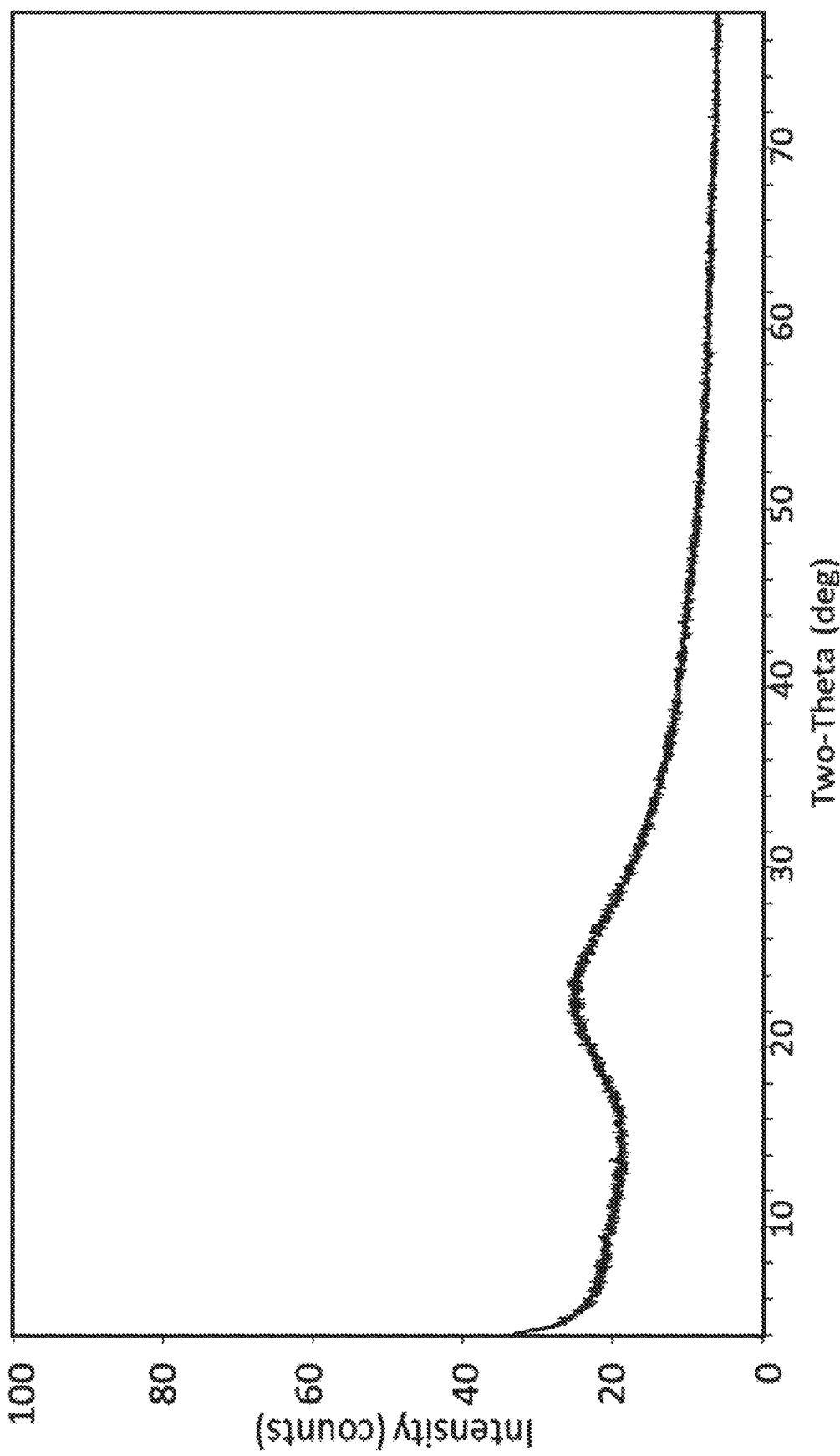
FIG. 6 shows a powder XRD pattern of the silica-alumina sample prepared in Example 5 after calcination at 1000° F.

The physical properties of the final, calcined silica-alumina are summarized in Table 1. After calcination at 1000° F., the silica-alumina was completely amorphous with no crystalline material present. The XRD pattern of the silica-composition in its calcined form is shown in FIG. 6. In its calcined form, the silica-alumina had a total pore volume of 1.45 cm$^3$/g and a total surface area of 384 m$^2$/g.

This silica-alumina was used to prepare the hydrocracking catalyst described in Example 14.

Example 6

Synthesis of High Pore Volume Silica-Alumina by Continuous Sol Preparation and Continuous Gellation Synthesis of silica-alumina of Example 5 was repeated except the aging of the slurry. The silica-alumina precipitate slurry was proceeded immediately to the filtration step without aging. Then cake was ammonium exchanged with the same procedure as in Example 5. The powder XRD pattern of the dry cake (data not shown) contained about 10% crystalline ammonium aluminum carbonate hydroxide hydrate, similar to Example 5. Upon calcination, the material became completely amorphous (data not shown). The calcined material had a pore volume of 1.23 cm$^3$/g and a surface area of 324 m$^2$/g. The properties of this material are summarized in Table 2.

Example 7

Synthesis of Silica-Alumina by Continuous Gellation

Preparation procedure was similar to that of Example 5 except that the acidic aluminum solution (Solution I, containing 6 wt. % Al$_2$O$_3$) was prepared by dissolving 1525 g of aluminum chloride and 453 g of hydrochloric acid (37%) in 3389 g of deionized water.

Figure 7:
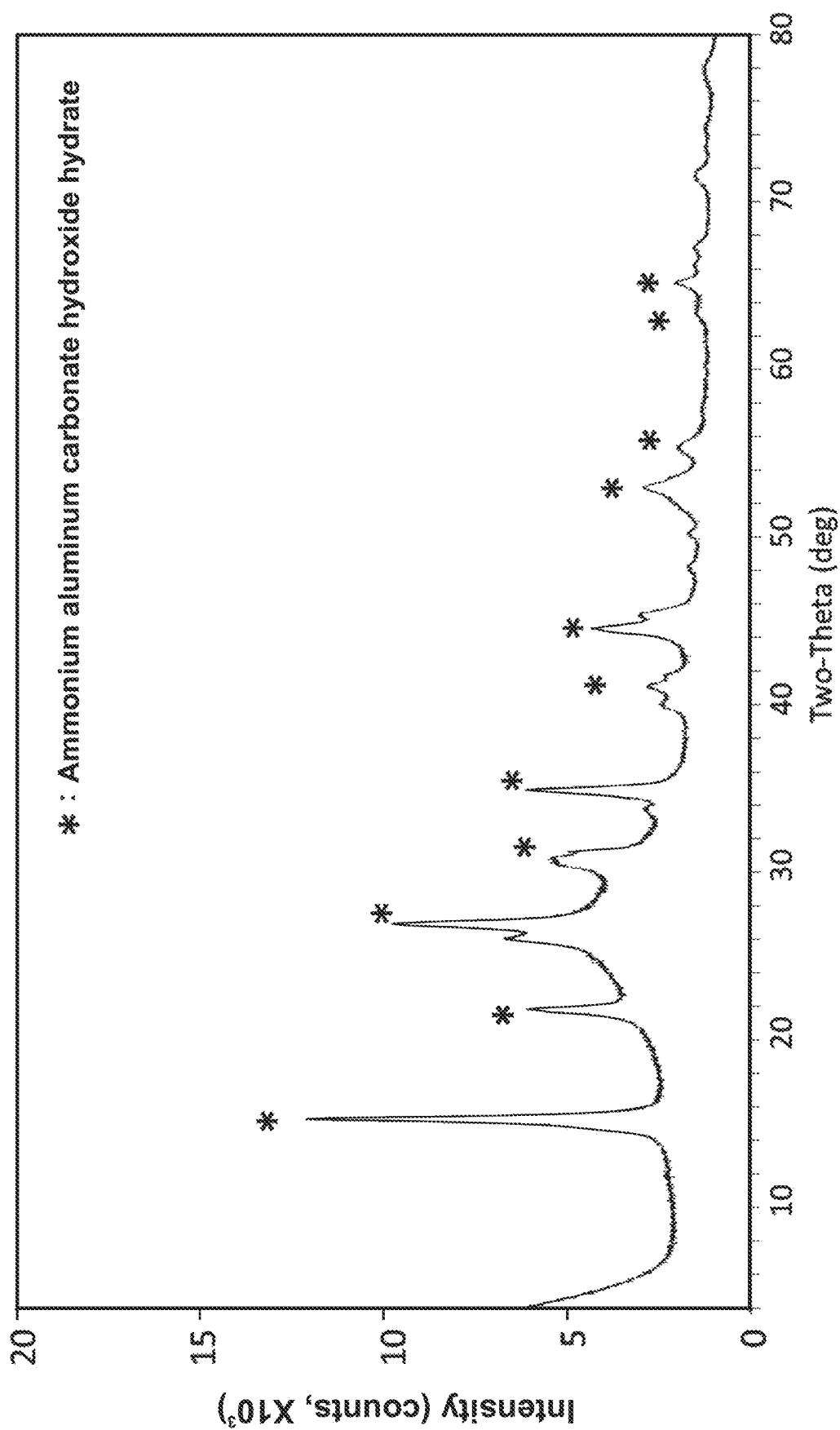
FIG. 7 shows a powder XRD pattern of the silica-alumina dried powder sample prepared in Example 7 prior to calcination.

The powder XRD pattern of the silica-alumina product is shown in FIG. 7 and indicates that the material contained about 10% crystalline ammonium aluminum carbonate hydroxide hydrate.

This silica-alumina was used to prepare the hydrocracking catalyst described in Example 15.

The physical properties of the final silica-alumina are summarized in Table 1.

Example 8

Synthesis of High Pore Volume Silica-Alumina by Continuous Gellation

Synthesis of silica-alumina of Example 7 was repeated. The total pore volume of this silica-alumina after calcination was 1.81 cm$^3$/g. The properties of this material are summarized in Table 2.

Example 9

Synthesis of Silica-Alumina by Continuous Gellation

Preparation procedure was similar to that of Example 7, except that the SiO$_2$/Al$_2$O$_3$ molar ratio was 3.0.

Figure 8:
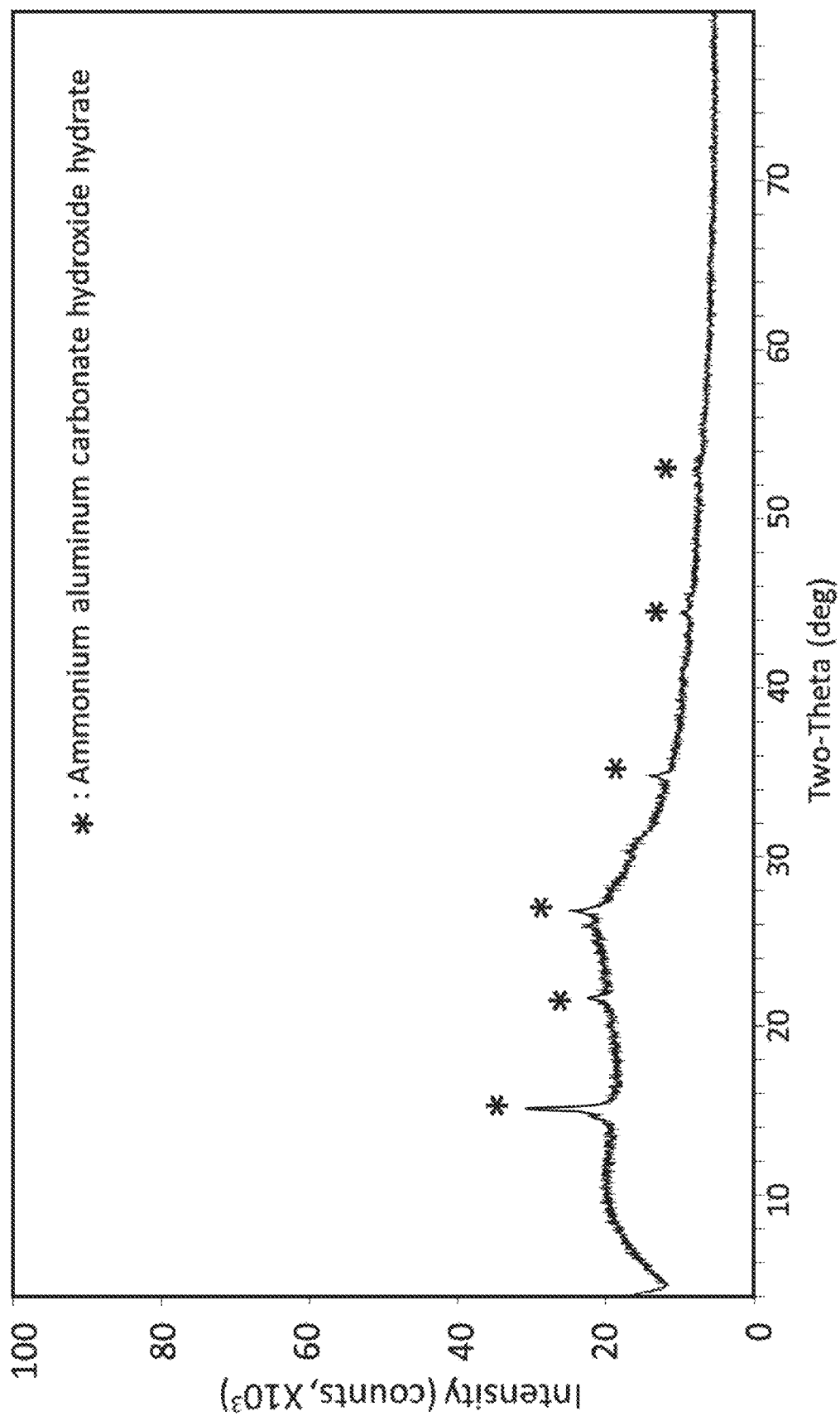
FIG. 8 shows a powder XRD pattern of the silica-alumina dried powder sample prepared in Example 9 prior to calcination.

The physical properties of the final silica-alumina are summarized in Table 1. The powder XRD pattern of the silica-alumina product is shown in FIG. 8 and indicates that the material contained about 5% crystalline ammonium aluminum carbonate hydroxide hydrate.

This silica-alumina was used to prepare the hydrocracking catalyst described in Example 16.

TABLE 1

Synthesis and Characterization of Silica-Alumina Powders

|  | Ex. 1 | Ex. 2 | Ex. 3 | Ex. 4 | Ex. 5 | Ex. 6 | Ex. 9 |
|---|---|---|---|---|---|---|---|
| Synthesis |  |  |  |  |  |  |  |
| Si Source |  |  | Na silicate | Na silicate | Na silicate | Na silicate | Na silicate |
| Al Source |  |  | $AlCl_3$ | $AlCl_3$ | $Al_2(SO_4)_3$ | $AlCl_3$ | $AlCl_3$ |
| $SiO_2:Al_2O_3$ mole ratio | 1.13:1 | 1.13:1 | 2:1 | 2:1 | 2:1 | 2:1 | 3:1 |
| Base Precipitating Agent |  |  | $NH_4OH$ | $(NH_4)_2CO_3$ | $(NH_4)_2CO_3$ | $(NH_4)_2CO_3$ | $(NH_4)_2CO_3$ |
| Precipitation Vessel |  |  | In-line blender | Open beaker | In-line blender | In-line blender | In-line blender |
| Slurry Aging Conditions |  |  | 25° C./2 h | 160° C./2 h | 160° C./2 h | 160° C./2 h | 160° C./2 h |
| XRD Analysis of Dried Powder |  |  |  |  |  |  |  |
| Crystalline AACH [%] | 0 | 0 | 0 | 0 | 10 | 10 | 5 |
| $N_2$ Physisorption of Calcined Sample[a] |  |  |  |  |  |  |  |
| BET Surface Area [m²/g] | 480 | 471 | 342 | 309 | 384 | 372 | 372 |
| Mean Pore Diameter [Å] | 149 | 186 | 138 | 190 | 400 | 427 | 365 |
| Total Pore Volume [cm³/g] | 1.04 | 1.56 | 0.79 | 0.49 | 1.45 | 1.77 | 1.54 |

[a] Physical properties determined by the B.E.T. method as described by S. Brunauer, P. Emmett, and E. Teller (*J. Am. Chem. Soc.* 1939, 60, 309-319).

Figure 9:
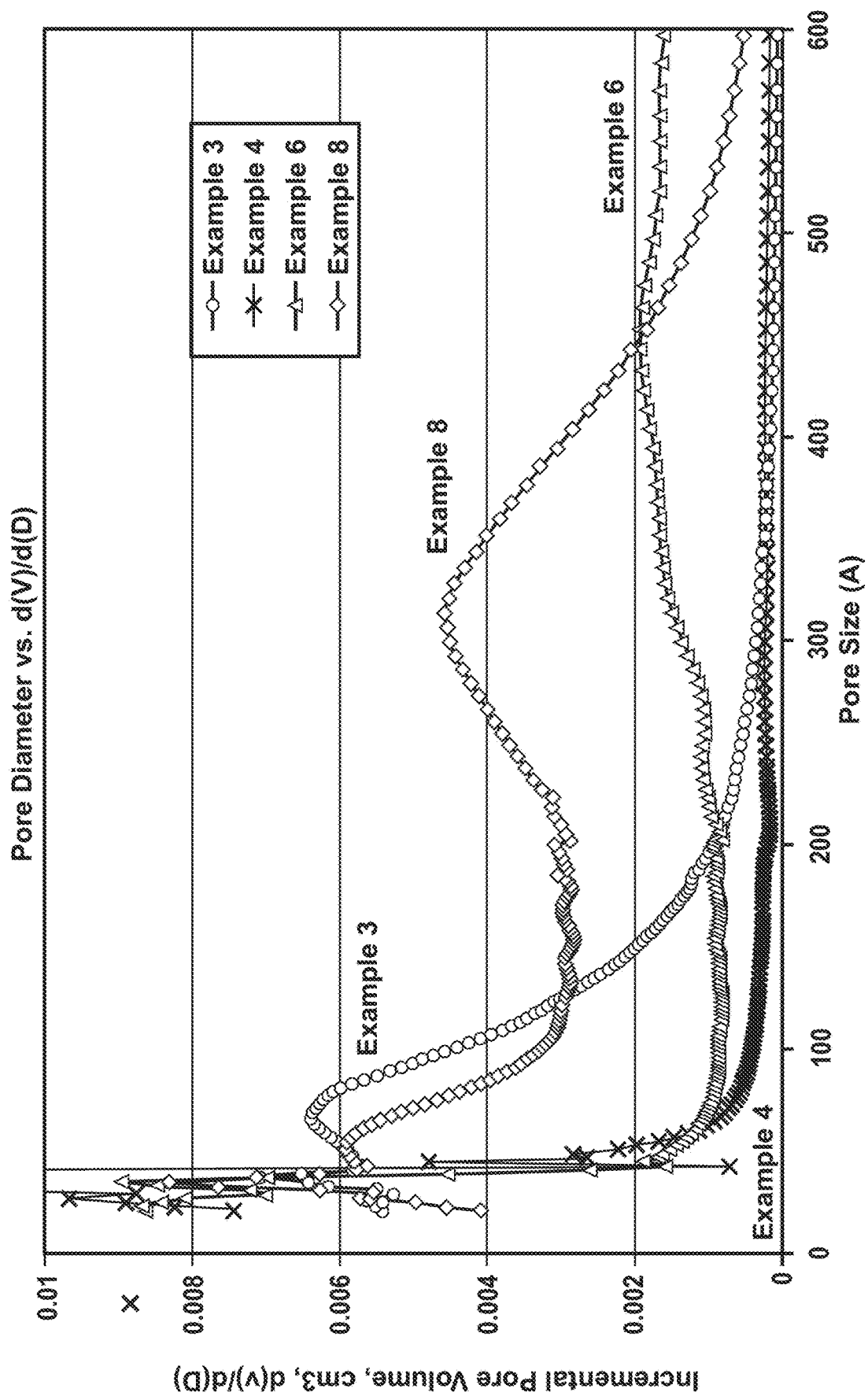
FIG. 9 shows the $N_2$ adsorption pore size distribution of the silica-alumina materials prepared in Examples 3, 4, 6 and 8.

Four cogel silica-alumina (Examples 3, 4, 6 and 8) were analyzed further to understand the source of the differences in properties and results are summarized in Table 2. FIG. 9 shows the $N_2$ pore size distributions of these materials.

TABLE 2

Synthesis and Characterization of Co-Gel Silica-Alumina Powders

|  | Ex. 3 | Ex. 4 | Ex. 6 | Ex. 8 |
|---|---|---|---|---|
| Synthesis |  |  |  |  |
| Si Source | Na silicate | Na silicate | Na silicate | Na silicate |
| Al Source | $AlCl_3$ | $AlCl_3$ | $Al_2(SO_4)_3$ | $AlCl_3$ |
| Precipitating Agent | $NH_4OH$ | $(NH_4)_2CO_3$ | $(NH_4)_2CO_3$ | $(NH_4)_2CO_3$ |
| Precipitation Vessel | In-line blender | Open beaker | In-line blender | In-line blender |
| Slurry Aging Conditions | 25° F./2 h | 160° F./2 h | — | 160° F./2 h |
| Dry Cake |  |  |  |  |
| Carbon [wt. %] | 0 | 0.093 | 2.71 | 2.06 |
| Presence of Crystalline AACH | — | No | Yes | Yes |
| $N_2$ Pore Size Distribution of Calcined Sample |  |  |  |  |
| Surface Area [m²/g] | 342 | 309 | 324 | 417 |
| Mean Pore Diameter [Å] | 138 | 190 | 416 | 278 |
| Total Pore Volume [cm³/g] | 0.79 | 0.49 | 1.23 | 1.81 |
| Micropore Volume [cm³/g] | 0 | 0 | 0 | 0 |
| Mesopore Volume at 20-200 Å pore diameter [cm³/g] | 0.68 | 0.37 | 0.30 | 0.69 |
| Mesopore Volume at 200-500 Å pore diameter [cm³/g] | 0.09 | 0.06 | 0.44 | 0.95 |
| Total Mesopore Volume [cm³/g] | 0.77 | 0.43 | 0.74 | 1.64 |
| Macropore Volume [cm³/g] | 0.02 | 0.06 | 0.49 | 0.17 |

As shown in Table 2, cogel silica-alumina prepared from precipitation with ammonium hydroxide solution (Example 3) had a mesopore pore volume of 0.73 cm³/g and the pores were predominantly in the 30 Å to 200 Å pore size range. The high pore volume silica-alumina of inventive Examples 6 and 8 also contained a substantial amount of mesopores in the 30 Å to 200 Å pore size range similar to the Example 3. Additionally, the cogel silica-alumina of Examples 6 and 8 contained substantial pore volume coming from mesopores larger than 200 Å. The large-pore silica-alumina of Examples 6 and 8 have a bi-modal pore size distribution of mesopores. The large mesopores provide the high pore volumes of 1.23 cm³/g and 1.81 cm³/g exhibited in Examples 6 and 8, respectively.

When the silica-alumina synthesis method was applied in an open beaker as in Example 4, the resulting silica-alumina did not produce a high-pore-volume silica-alumina. This material had a total pore volume of only 0.49 cm³/g.

Elemental analysis of the dry cake of Example 4 showed that there is little carbon indicating the role of ammonium carbonate is to neutralize the acidic $AlCl_3$ solution to cause precipitation of silica-alumina gel, but not incorporation of carbonate in the silica-alumina gel. The elemental analysis of Examples 6 and 8 dry powder samples showed 2.7 wt. % and 2.1 wt. % of carbon, respectively, indicating incorporation of carbonate in the silica-alumina. Powder X-ray diffraction spectra of the silica-alumina materials show the presence of crystalline ammonium aluminum carbonate hydroxide hydrate. The results show that incorporation of ammonium carbonate and presence of crystalline ammonium aluminum carbonate hydroxide hydrate phase in the cogel is required to make the high pore volume silica-alumina of the present disclosure.

Example 10

Model Compound Testing

Silica-alumina compositions of Examples 1-3, 5 and 7 were subjected to model compound testing where the catalytic activity of the compositions was measured using a model feed containing 50 wt. % n-hexane (n-C6) and 50 wt. % 3-methylpentane (MP). Testing was performed at 900° F. The hydrocarbon feed, vaporized in helium carrier gas, was flown over 24/40 US mesh pelleted silica-alumina at 0.68 $h^{-1}$ WHSV per gram of catalytic material and conversions of the hydrocarbon species were measured using gas chromatography. The results are shown in Table 3.

TABLE 3

Comparison of Silica-Alumina with Model Compound Testing

| | Ex. 1 | Ex. 2 | Ex. 3 | Ex. 5 | Ex. 7 |
|---|---|---|---|---|---|
| n-C6 Conversion [%] | 1.0 | 1.3 | 1.6 | 0.9 | 1.6 |
| 3-MP Conversion [%] | 14.9 | 18.1 | 21.1 | 12.8 | 9.7 |
| C6 Isomerization Selectivity [%] | 26.9 | 33.6 | 36.0 | 39.9 | 37.1 |

Table 3 shows that cogel silica-alumina (Example 3) has higher activity than SIRAL silica-alumina materials (Examples 1-2) which contain pseudoboehmite, a separate phase of crystalline alumina. Without being bound by theory, it is believed that cogel silica-alumina of the present disclosure utilizes aluminum more effectively by creating completely amorphous silica-alumina made of small domains of silica and alumina, thereby resulting in more acid sites as evidenced by the higher activity.

Inventive Examples 5 and 7 contain the cogel silica-alumina and large pores. Since the pores are very large for the model compound adsorption, the conversion of 3-methylpentane dropped some. These silica-alumina materials are very effective in isomerizing n-hexane. These characteristics of silica-alumina (large pores and high acid site concentration) may be useful in developing second-stage hydrocracking catalysts where it is desirable to minimize overcracking of diesel component to naphtha.

Example 11 (Comparative)

Preparation of NiW Hydrocracking Catalyst with Silica-Alumina Catalyst A

A base-case hydrocracking catalyst containing SIRAL-40 silica-alumina of Example 1 was prepared per the following procedure. 67 parts of SIRAL-40 silica-alumina powder, 8 parts of low-acidity ultrastable Y (USY) zeolite and 25 parts of pseudoboehmite alumina powder were mixed well. To the mix, dilute nitric acid and a sufficient amount of deionized water were added to form an extrudable paste (1 wt. % $HNO_3$ to the total powders, on 100% solids basis). The paste was extruded in 1/16" cylinder and dried at 250° F. overnight. The dried extrudates were calcined at 1100° F. for 1 hour with purging excess dry air and cooled down to room temperature.

Nickel and tungsten were impregnated using a solution containing nickel nitrate and ammonium metatungstate to the target metal loadings in the finished catalyst. The total volume of the solution matched the 100% water pore volume of the base extrudate sample (incipient wetness method). The metal solution was added to the base extrudates gradually while tumbling the extrudates. When the solution addition was complete, the soaked extrudates were aged for 2 hours. Then the extrudates were dried at 250° F. overnight. The dried extrudates were calcined at 935° F. for 1 hour with purging excess dry air and cooled down to room temperature.

Example 12 (Comparative)

Catalyst B

A base-case hydrocracking catalyst containing SIRAL-40 HPV silica-alumina of Example 2 was prepared per the following procedure. 73 parts of SIRAL-40 HPV silica-alumina powder, 2 parts of low-acidity USY zeolite and 25 parts of pseudoboehmite alumina powder were mixed well. To the mix, dilute nitric acid and a sufficient amount of deionized water were added to form an extrudable paste (1 wt. % $HNO_3$ to the total powders, on 100% solids basis). The paste was extruded in 1/16" cylinder and dried at 250° F. overnight. The dried extrudates were calcined at 1100° F. for 1 hour with purging excess dry air and cooled down to room temperature. Nickel and tungsten were impregnated as described in Example 11.

Example 13 (Comparative)

Catalyst C

Example 12 was repeated except that the silica-alumina of Example 3 was used instead of SIRAL-40 HPV.

Example 14

Catalyst D

Example 12 was repeated except that the silica-alumina of Example 5 was used instead of SIRAL-40 HPV.

Example 15

Catalyst E

Example 12 was repeated except that the silica-alumina of Example 7 was used instead of SIRAL-40 HPV.

Example 16

Catalyst F

Example 12 was repeated except that the silica-alumina of Example 9 was used instead of SIRAL-40 HPV.

The properties of the finished Catalysts A through F are summarized in Table 4.

TABLE 4

Catalyst Properties and Performance

|  | Catalyst A | Catalyst B | Catalyst C | Catalyst D | Catalyst E | Catalyst F |
|---|---|---|---|---|---|---|
| Bulk Density [g/cm$^3$] | 0.91 | 0.86 | 1.00 | 0.68 | 0.73 | 0.81 |
| N$_2$ BET Surface Area$^{(a)}$ [m$^2$/g] | 267 | 235 | 172 | 203 | 194 | 165 |
| N$_2$ Total Pore Volume$^{(a)}$ [cm$^3$/g] | 0.44 | 0.45 | 0.31 | 0.62 | 0.55 | 0.44 |
| Hg Total Pore Volume$^{(b)}$ [cm$^3$/g] | 0.40 | 0.44 | 0.34 | 0.58 | 0.60 | 0.51 |
| Activity [° F. for 70% Conversion of 650° F.+] | 676 | 682 | 674 | 691 | 684 | 682 |
| Yields at 70% Conversion [wt. %] | | | | | | |
| C4− Gas | 2.9 | 3.2 | 3.5 | 3.9 | 3.5 | 4.0 |
| Naphtha [C5 - 250° F.] | 10.6 | 11.9 | 12.1 | 11.1 | 12.5 | 13.1 |
| Heavy Naphtha [250° F. to 380° F.] | 20.8 | 17.4 | 17.8 | 18.7 | 17.6 | 18.1 |
| Light Distillate [380° F. to 550° F.] | 24.2 | 23.4 | 23.0 | 22.8 | 22.8 | 22.7 |
| Heavy Distillate [550° F. to 700° F.] | 16.2 | 18.7 | 18.2 | 18.1 | 18.3 | 17.6 |
| Total Distillate [380° F. to 700° F.] | 40.4 | 42.1 | 41.2 | 40.9 | 41.1 | 40.4 |

$^{(a)}$Physical properties determined by the B.E.T. method as described by S. Brunauer, P. Emmett, and E. Teller (J. Am. Chem. Soc. 1939, 60, 309-319).
$^{(b)}$Physical properties determined by the mercury intrusion method at a mercury surface tension of 484 dyne/cm with a mercury contact angle of 140° in accordance with ASTM D4284.

As shown in Table 4, the finished catalyst made with cogel silica-alumina (Catalyst C) has a higher bulk density and a lower pore volume as measured by N$_2$ physisorption and Hg porosimetry, respectively, as compared to the catalysts made with benchmark silica-alumina (Catalyst A and B). As the base precipitating agent was switched to ammonium carbonate, the pore volume of the cogel silica-alumina increased significantly. The increased pore volume of silica-alumina allowed high pore-volume catalyst preparation as shown in Catalysts, D, E and F. Inventive catalysts (Catalysts D, E and F) have higher pore volume and lower bulk density than either of the benchmarks (Catalyst A and B).

Example 17

Hydrocracking Catalyst Testing

The catalysts prepared above were tested under hydrocracking conditions in a once-through, down-flow microunit with 6 cm$^3$ of 24/40 (US) meshed catalyst. The feedstock utilized in the testing was a typical hydrocracking hydrocarbon feedstock having the properties set forth in Table 5.

TABLE 5

Hydrocarbon Feedstock Properties

| API Gravity | 31 |
|---|---|
| Sulfur [wppm] | 20.2 |
| Nitrogen [wppm] | 1.28 |
| ASTM D2887 Simulated Distillation | |
| Initial Boiling Point | 637° F. |
| 10 wt. % | 686° F. |
| 30 wt. % | 770° F. |
| 50 wt. % | 825° F. |
| 70 wt. % | 890° F. |

TABLE 5-continued

Hydrocarbon Feedstock Properties

| 90 wt. % | 987° F. |
|---|---|
| Final Boiling Point | 1100° F. |

Operating conditions included a reactor pressure of 2000 psig; a feed rate of 1.5 h$^{-1}$ LHSV; and a once-though H$_2$ flow rate 5000 SCF of H$_2$/bbl of oil. The catalyst bed temperature was varied to cover 60-80 wt. % of conversion of the 700° F.+ feed to 700° F.− product. The yields of C4− gas, naphtha, and light and heavy distillate components were calculated using ASTM D2887 simulated distillation analysis results. The overall yields and reactor temperature data were interpolated to 70 wt. % conversion and summarized in Table 4. Inventive Catalysts D, E and F showed about 2% greater heavy distillate selectivity than the SIRAL-40 benchmark catalyst (Catalyst A). Improved distillate selectivity are quite unexpected benefits of the silica-alumina compositions of the present disclosure. These hydrocracking catalysts with high pore volume and containing large mesopores are expected to perform well particularly for the conversion of heavy, high-molecular weight hydrocarbons.

The invention claimed is:

1. A process for preparing an amorphous silica-alumina composition, wherein the process comprises the steps of:
   (a) mixing an aqueous solution of a silicon compound and an aqueous solution of an aluminum compound which is an aluminum salt or an alkali metal aluminate, and an acid, while maintaining a pH of the mixed solution in a range of 1 to 3, and obtaining an acidified silica-alumina sol;
   (b) adding an aqueous solution of a base precipitating agent to the acidified silica-alumina sol and mixing the combination of the aqueous solution of the base precipitating agent and the acidified silica-alumina sol while maintaining the pH within a range of 6.5 to 7.5 and applying back pressure to prevent carbonate from leaving the mixture via $CO_2$ evolution, and co-precipitating a silica-alumina slurry, wherein the base precipitating agent is selected from ammonium carbonate, ammonium bicarbonate, and any combination thereof;

(c) optionally, hydrothermally aging the silica-alumina slurry to form a hydrothermally aged silica-alumina slurry; and (d) recovering a precipitate solid from the silica-alumina slurry or the hydrothermally aged silica-alumina slurry, wherein the precipitate solid comprises the silica-alumina composition, with the silica-alumina precipitate solid comprising from 5 to 15 wt % of a crystalline phase which is ammonium aluminum carbonate hydroxide hydrate.

2. The process according to claim 1, further comprising subjecting the silica-alumina composition obtain in step (d) to washing, ion exchange, drying and/or calcination.

3. The process according to claim 2, which comprises spray drying the silica-alumina composition obtained in step (d).

4. The process of claim 1, wherein the silicon compound is selected the group consisting of an alkali metal silicate, silicic acid, colloidal silica, precipitated silica, fumed silica, and any combination thereof.

5. The process of claim 1, wherein the silicon compound is sodium silicate.

6. The process of claim 5, wherein the sodium silicate has a $SiO_2/Na_2O$ weight ratio in a range of from 2.5 to 3.5.

7. The process of claim 1, wherein the aqueous solution comprising the silicon compound comprises the silicon compound in an amount ranging from 2% to 15% by weight of silicon, expressed as $SiO_2$.

8. The process of claim 1, wherein the aqueous solution comprising the aluminum compound comprises the aluminum compound in an amount ranging from 2% to 25% by weight of aluminum, expressed as $Al_2O_3$.

9. The process of claim 1, wherein the acid is selected from the group consisting of formic acid, acetic acid, hydrochloric acid, nitric acid, sulfuric acid, and any combination thereof.

10. The process of claim 1, wherein hydrothermal aging in step (c) is carried out at a temperature of from 20° C. to 200° C. for a period of from 1 to 6 hours.

11. The process of claim 1, wherein the aluminum salts comprise aluminum halides.

12. A continuous process for preparing a silica-alumina composition, wherein the process comprises the steps of:

(a) continuously contacting and mixing an aqueous solution of a silicon compound and an aqueous solution of an aluminum compound and an acid in a first mixing zone, while maintaining a pH of the mixed solution in a range of 1 to 3;

(b) removing a first mixture from the first mixing zone continuously, wherein the first mixture comprises an acidified silica-alumina sol;

(c) continuously contacting and mixing the first mixture and an aqueous solution of a base precipitating agent in a second mixing zone while maintaining a pH in a range of from 5 to 8 to produce a silica-alumina slurry, wherein the base precipitating agent is selected from ammonium carbonate, ammonium bicarbonate, and any combination thereof;

(d) removing the silica-alumina slurry from the second mixing zone continuously; and (e recovering a precipitate solid from the silica-alumina slurry, wherein the precipitate solid comprises the silica-alumina composition with the silica-alumina precipitate solid comprising from 5 to 15% by weight of a crystalline phase which is ammonium aluminum carbonate hydroxide hydrate.

* * * * *